United States Patent
Ueda

(10) Patent No.: US 7,599,929 B2
(45) Date of Patent: Oct. 6, 2009

(54) DOCUMENT USE TRACKING SYSTEM, METHOD, COMPUTER READABLE MEDIUM, AND COMPUTER DATA SIGNAL

(75) Inventor: Yoshihiro Ueda, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 183 days.

(21) Appl. No.: 11/553,611

(22) Filed: Nov. 9, 2006

(65) Prior Publication Data
US 2007/0265994 A1    Nov. 15, 2007

(30) Foreign Application Priority Data
May 9, 2006    (JP)    ............................... 2006-130595

(51) Int. Cl.
*G06F 7/00* (2006.01)
*G06F 17/30* (2006.01)

(52) U.S. Cl. ............................................. 707/5; 707/1
(58) Field of Classification Search .............. 707/1–6, 707/9, 10, 100–102
See application file for complete search history.

(56) References Cited

U.S. PATENT DOCUMENTS

| | | | | |
|---|---|---|---|---|
| 6,493,663 | B1 * | 12/2002 | Ueda | 704/9 |
| 7,020,651 | B2 * | 3/2006 | Ripley | 707/6 |
| 7,181,438 | B1 * | 2/2007 | Szabo | 707/2 |
| 7,284,008 | B2 * | 10/2007 | Henkin et al. | 707/102 |
| 2003/0050909 | A1 * | 3/2003 | Preda et al. | 707/1 |
| 2005/0027670 | A1 * | 2/2005 | Petropoulos | 707/1 |
| 2006/0136451 | A1 * | 6/2006 | Denissov | 707/101 |
| 2007/0073748 | A1 * | 3/2007 | Barney | 707/101 |
| 2007/0162424 | A1 * | 7/2007 | Jeh et al. | 707/2 |
| 2007/0276829 | A1 * | 11/2007 | Wang et al. | 707/7 |

FOREIGN PATENT DOCUMENTS

| | | |
|---|---|---|
| JP | 9311802 | 12/1997 |
| JP | 11249777 | 9/1999 |
| JP | 11259459 | 9/1999 |
| JP | 2001125841 | 5/2001 |
| JP | 2003016057 | 1/2003 |
| JP | 2003157212 | 5/2003 |
| JP | 2003280993 | 10/2003 |
| JP | 2004140715 | 5/2004 |

* cited by examiner

*Primary Examiner*—Don Wong
*Assistant Examiner*—Merilyn P Nguyen
(74) *Attorney, Agent, or Firm*—Gauthier & Connors LLP

(57) ABSTRACT

There is provided a document use tracking system including a use history recording unit that records, for each document stored in a document storage unit, a use history record for each user about each element in the document, a search condition reception unit that receives an input of a search condition, an element score calculation unit that calculates, for each element of each document, an element score indicating closeness of fit of the element for the search condition, an importance score calculation unit that calculates, for each combination of an element and a user who has performed an operation, an importance score based on the element score of the element and the use history record of the user for the element, and a monitored object information presentation unit that presents the importance score calculated by the importance score calculation unit and the user corresponding to the importance score.

16 Claims, 6 Drawing Sheets

Fig. 3

X07: MERGE USE HISTORIES OF THE TARGET DOCUMENT

Table 206:

| DOCUMENT ID (SERVER AND DOCUMENT) | | OPERATION CATEGORY | OPERATION TIME | OPERATION DETAILS |
|---|---|---|---|---|
| S001 | D00201 | OPEN | 2003/10/22 10:22:12 | |
| S002 | D10228 | OPEN | 2003/10/22 11:02:33 | |
| S002 | D22045 | OPEN | 2003/10/22 11:03:12 | |
| S002 | D10228 | JUMP PAGE | 2003/10/22 11:04:35 | 5P |
| S002 | D10228 | COPY CHARACTER STRING | 2003/10/22 11:12:22 | DETAILS OF PERFORMANCE OF A NEW MODEL |
| S002 | D10228 | JUMP PAGE | 2003/10/22 11:14:29 | 6P |
| S002 | D10228 | CLOSE | 2003/10/22 11:14:51 | |
| S002 | D33102 | OPEN | | |
| S001 | D29482 | OPEN | | |
| .. | .. | .. | .. | |

Table 105:

| DOCUMENT ID | USER ID | OPERATION CATEGORY | OPERATION TIME | VIEWED PAGE | COPIED CONTENTS | VIEWED TIME PERIOD |
|---|---|---|---|---|---|---|
| D10228 | U02664 | VIEW DOCUMENT | 2003/10/22 10:22:12 | | | 00:12:10 |
| D10228 | U04667 | VIEW DOCUMENT | 2003/10/22 11:02:33 | | | 00:12:18 |
| D10228 | U04667 | VIEW PAGE | 2003/10/22 11:02:33 | 1P | | 00:02:03 |
| D10228 | U04667 | VIEW PAGE | 2003/10/22 11:04:35 | 5P | | 00:09:54 |
| D10228 | U04667 | COPY CHARACTER STRING | 2003/10/22 11:12:22 | 5P | DETAILS OF PERFORMANCE OF A NEW MODEL | N/A |
| D10228 | U04667 | VIEW PAGE | 2003/10/22 11:14:29 | 6P | | 00:00:22 |
| D22045 | U04667 | VIEW DOCUMENT | 2003/10/22 11:07:12 | | | 01:23:41 |
| D33102 | U04667 | | | | | |
| D33102 | U12042 | | | | | |
| D35184 | U12042 | | | | | |
| .. | .. | .. | .. | | | .. |

DOCUMENT USE TRACKING SYSTEM, METHOD, COMPUTER READABLE MEDIUM, AND COMPUTER DATA SIGNAL

PRIORITY INFORMATION

This application claims priority from Japanese Patent Application No. 2006-130595, filed on May 9, 2006, which is incorporated herein by reference in its entirety.

BACKGROUND

1. Technical Field

The present invention relates to a system for monitoring use of an electronic document by each user.

2. Related Art

For the sake of information security in organizations, such as business enterprises, actions have been taken to store electronic documents of a company in a particular document management server, and record a history of user access to the electronic documents in the document management server.

The above technique basically records the history of operations and access with an electronic document as a unit. When, for example, leakage of an electronic document is discovered, users who have accessed the electronic document can be narrowed down by checking the history information recorded in accordance with such a technique.

SUMMARY

According to an aspect of the present invention, there is provided a document use tracking system including a use history recording unit that records, for each document stored in a document storage unit, a use history record for each user about each element in the document, a search condition reception unit that receives an input of a search condition, an element score calculation unit that calculates, for each element of each document, an element score indicating closeness of fit of the element for the search condition, an importance score calculation unit that calculates, for each combination of an element and a user who has performed an operation on the element, an importance score based on the element score of the element and the use history record of the user for the element, and a monitored object information presentation unit that presents the importance score calculated by the importance score calculation unit and the user corresponding to the importance score.

BRIEF DESCRIPTION OF THE DRAWINGS

Embodiments of the present invention will be described in detail by reference to the following figures, wherein:

FIG. 3 is a view for describing a process for merging use history records;

DETAILED DESCRIPTION

Exemplary embodiments of the present invention will be described with reference to the drawings.

Figure 1:
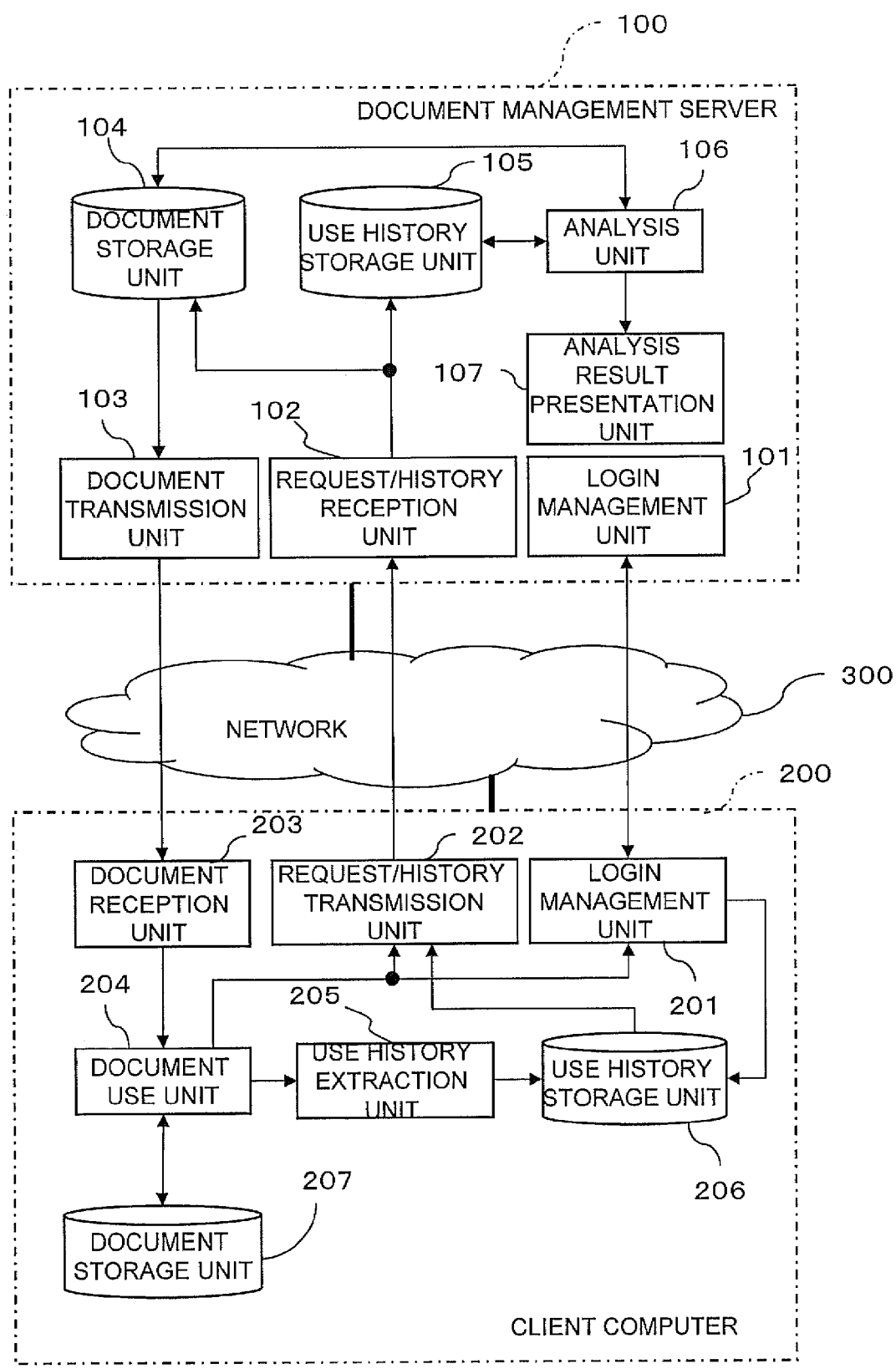
FIG. 1 shows a general presentation of a system of an exemplary embodiment of the present invention.

FIG. 1 shows a general representation of a system according to an exemplary embodiment. For description purposes, a document management server 100 and a client computer 200 connected via a network 300 are collectively referred to as a document management system.

As shown in FIG. 1, the document management system includes the document management server 100 and the client computer 200 connected to the network 300. Although a single server 100 and a single computer 200 are illustrated, multiple servers 100 and multiple computers 200 may naturally be provided. The network 300 may be any communication network, such as a LAN, a WAN, or the Internet.

The document management server 100 stores electronic documents (hereinafter simply referred to as "documents") used by users, provides a user with the document in response to a request, and records a history of operation performed by the user on the document (referred to as a "use history") in the present system. The document management server 100 produces analysis data on the basis of the recorded use history and data for each document so as to facilitate an attempt to narrow down a source of information leakage and the like.

The document provided by the document management server 100 may be a document that can hold attribute data of the document in addition to the content data thereof. A unique document ID (identification information) is incorporated into the document as attribute data. An ID whose uniqueness is globally guaranteed, such as a globally unique identifier (GUID) or a universally unique identifier (UUID), may be used as a document ID. In such a case, there may be used a configuration in which a directory server for detecting which document management server 100 manages a document of interest is provided on the network, so that, when the document ID is provided to the directory server by the client computer 200, the document management server 100 managing the document with that document ID can be determined.

Alternatively, as the document ID of the document managed by the document management server 100, a combination of a server ID uniquely assigned to that document management server 100 and an ID uniquely assigned to the document in that document management server 100 may be used.

Represented as function blocks, the document management server 100 includes a login management unit 101, a document use request/document use history reception unit 102, a document transmission unit 103, a document storage unit 104, a use history storage unit 105, an analysis unit 106, and an analysis result presentation unit 107. Each of these function blocks is typically implemented as software.

The login management unit 101 manages a login of a user using the client computer 200. Upon a login process, the login management unit 101 receives input of authentication information, such as a user ID and password, from the user, and performs user authentication based on the information. The user ID specified through user authentication may be stored in the use history storage unit 105 as part of a use history.

The request/history reception unit 102 receives a document use request from the client computer 200, and also a use history of a document. The document use request is made to request a download of a document by specifying a file name or the like. The document use history is a history of operations performed by the user using the client computer 200 on each document between the logout made upon the last access to the document management server 100 of interest and the current login. According to the present exemplary embodiment, the client computer 200 records a history of operations performed on a document by a user while the user does not access the document management server 100, and transmits the recorded use history to the document management server 100 the next time the user accesses the document management server 100. The request/history reception unit 102 receives the document use history thus transmitted from the client computer 200, and stores it in the use history storage unit 105. The configuration of the request/history reception unit 102 may be divided into a section receiving the document use request and a section receiving the document use history.

In response to the document use request from the client computer 200, the document transmission unit 103 reads out the document from the document storage unit 104, and transmits it to the client computer 200. The document storage unit 104 stores documents provided to users.

The analysis unit 106 analyzes the degree of involvement in information of interest for each user. For example, when information leakage is discovered, this analysis unit 106 is utilized to narrow down users closely involved in the leaked information. The analysis unit 106 performs such an analysis on the basis of the documents stored in the document storage unit 104 and the use history stored in the use history storage unit 105. The analysis performed by the analysis unit 106 will be described later in detail.

The analysis result presentation unit 107 presents the result of the analysis performed by the analysis unit 106 on a display or the like.

The client computer 200 is a computer used by a user utilizing the document. Represented by functional blocks, the client computer 200 includes a login management unit 201, a request/history transmission unit 202, a document reception unit 203, a document use unit 204, a use history extraction unit 205, a use history storage unit 206, a document storage unit 207, and the like. Each functional block of the client computer 200 may be implemented as a process of an application program, an OS (operating system), or the like.

The login management unit 201 performs a login protocol for logging into the document management server 100. In the login protocol, a user is requested to provide authentication information, such as a user ID and password, and the information is transmitted to the login management unit 101 of the document management server 100 for user authentication. Upon this operation, the document use history may be registered in the use history storage unit 206 in association with the user ID used for the login.

The request/history transmission unit 202 performs a process for transmitting a document use request; i.e., a document download request, to the document management server 100, and a process for transmitting to the document management server 100 the document use history stored in the use history storage unit 206. The document use histories are collectively transmitted upon the login to the document management server 100.

The document reception unit 203 receives a document transferred from the document management server 100 in response to the document use request. The received document is used by the document use unit 204. The document use unit 204 may provide a document browsing service function. The unit 204 receives from a user an operation instruction, such as opening a document, moving a page to be displayed, scrolling a displayed section on the same page, copying a character string or other data in the document, using a hyperlink in the document, adding an annotation (i.e. annotation data added to the document separately from the content data of the document), or the like, and performs the operation in accordance with the instruction.

The use history extraction unit 205 detects the operation on the document use unit 204 performed by the user on the document, and produces a use history record indicating information related to the operation. The produced use history record is stored in the use history storage unit 206.

The use history record produced corresponding to one operation may include a document ID of a document subjected to the operation, "operation category" indicating the category of the operation, "operation time" indicating the time the operation is performed, and "operation details" indicating details of the operation (as, for example, shown in FIG. 3). When multiple document management servers 100 for providing the client computer 200 with documents are used, a server ID uniquely identifying the document management server 100 providing the document may be incorporated in the document ID. In this case, the document ID may be a combination of the server ID and the ID uniquely identifying the document in that document management server 100. The "operation category" may include "Open" and "Close" of the document file, "Jump page" for switching the page to be displayed, "Scroll" on the page, "Copy character string" for copying data of a character string in the document selected by the user, and the like, as described above. When, for example, the page jumping operation for jumping the page to be displayed is performed, the page number to jump to is the information to be recorded in a column of "Operation Details." For the operation of copying a character string, the copied character string is recorded in the "Operation Details" column.

When the client computer 200 is shared by multiple users, the user ID of the user performing the operation may be recorded in the use history record. In this case, the user ID presented by the user upon login to the OS or the document viewer (which includes the document use unit 204) of the client computer 200 may be used as the user ID. For example, if the local user ID for the OS or the document viewer is the same as the user ID for the document management server 100, the user ID recorded in the use history record can be directly used for the document management server 100. The login management unit 201 may hold the correspondence data between the local user ID for the client computer 200 and the user ID for the document management server 100. In this case, when a user performs an operation on a document on the client computer 200, the use history extraction unit 205 may convert the local user ID provided by the user into the user ID for the document management server 100 in accordance with the correspondence data, and record it in the use history record.

If it can safely be assumed that the client computer 200 is dedicated to personal use, the use history record need not record the user ID.

Information on the place where the operation is performed may be recorded in the use history record. The location information may be acquired by a GPS (global positioning system) device provided in the client computer 200, or input by the user when the document is opened. The client computer 200 may acquire information on the room where the user is located from a room entry control system, and record it as location information.

The document received by the document reception unit 203 may be stored in the document storage unit 207. Users can later open and use the document stored in the document storage unit 207 by means of the document use unit 204. For such a reuse as well, a use history record is made.

The configuration of the request/history transmission unit 202 of the client computer 200 may also be divided into a section transmitting a document use request and a section transmitting a document use history.

Among the functional blocks of the client computer 200, the request/history transmission unit 202, the document reception unit 203, the document use unit 204, and the use history extraction unit 205 can be implemented as function modules of the document viewer software dealing with the downloaded document. Further, the login management unit 201 may also be incorporated into the document viewer software.

Figure 2:
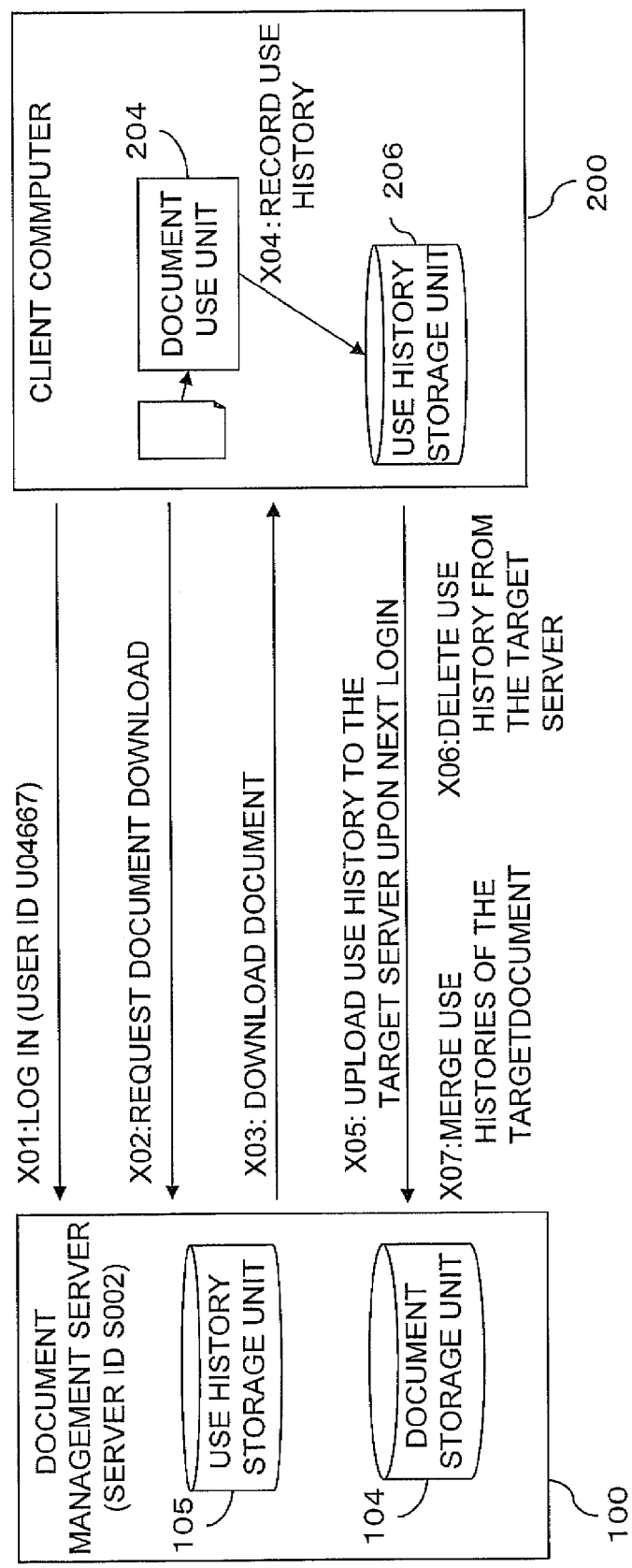
FIG. 2 is a view for describing a flow of a process for collecting a use history.

A flow of a use history collection process will next be described with reference to FIG. 2. In this flow, a user of the client computer 200 logs into the document management server 100 (X01). In the login process, a user ID ("U04667" in this example") is transmitted from the client computer 200 to the document management server 100.

After the login, the user transmits a document download request to the document management server 100, and acquires a desired document (X02, X03). The document management server 100 fetches the requested document from the document storage unit 104, and sends it back to the requesting client computer 200.

The document use unit 204 opens the document file received by the document reception unit 203 in accordance with the user's instruction, and provides the document for use by the user. The document use unit 204 performs an operation on the document in accordance with an operation instruction from the user. The use history extraction unit 205 monitors the document use unit 204 to produce a use history record indicating the operation performed on the document by the user, and stores the record in the use history storage unit 206 (X04).

The user may use the document use unit 204 to open the document (including the document ID) downloaded from the document management server 100 and stored in the document storage unit 207, and perform an operation on the document. The use history extraction unit 205 also produces a use history record for the operation on the document read from the document storage unit 207, and stores it in the use history storage unit (X04).

Thus, when an operation is performed on a document on the client computer 200, the use history extraction unit 205 produces a history of the operation (i.e. use history record), and registers it in the use history storage unit 206.

A collection of use history records for each of the documents accumulated in the use history storage unit 206 is uploaded to the document management server 100 next time the user logs into that document management server 100 (X05). When multiple document management servers 100 are provided in the system, only the use history record for the document downloaded from the logged-in document management server 100 is uploaded among the use history records accumulated in the use history storage unit 206. Note that whether or not to upload each use history record to the logged-in document management server 100 can be determined with use of the document ID of the use history record, because the document ID included in the document downloaded from the document management server 100 includes the information that can specify that the document management server 100 and the use history record include the document ID. The use history record thus uploaded may be deleted from the use history storage unit 206 of the client computer 200 (X06).

The document management server 100 registers the use history record received from the client computer 200 in the use history storage unit 206 (X07). At this step, the document management server 100 may merge those of the use history records received from the client computer 200 that have a particular relationship, and register them in the use history storage unit 105 to facilitate a later analysis. Such a merging process will be described with reference to FIG. 3.

In the merging process shown in FIG. 3, for example, a pair of opening operation and closing operation (following the opening operation) for the same document are extracted among the use history records registered in the use history storage unit 206 of the client computer 200, and collectively recorded as a document viewing operation record. In the illustrated example, the second and seventh records in a table held in the use history storage unit 206 (hereinafter simply referred to as a table 206; the same applies to a table 105) forms a pair to be recorded as the second record ("View document") in the table 105.

The use history record registered in the use history storage unit 105 of the document management server 100 includes items of document ID, user ID, operation category, operation time, viewed page, copied content, and viewed time period. The document ID, user ID, operation category, and operation time are described above. The viewed page is information indicating a page number viewed by the user, and can be obtained from the use history record of the page jump operation. The copied content is the data indicating the content of a character string or the like copied from the document by the user, and can be obtained from the use history record for the copying operation. The viewed page and the copied content can both be produced from information on "operation details" of the use history record produced by the client computer 200. The viewed time period is the period during which the user has viewed the document or the page of that document. The viewed time period can be obtained by combining information items on the operation time in the use history record. For example, the pair of second and seventh records in the illustrated table 206 indicates the span from the time a document is opened to the time it is closed, and a difference in operation time between opening and closing equals the overall viewed time period for the document.

In the merging operation illustrated in FIG. 3, the record of "View Page 1" indicated as the third record in the table 105 is produced from the second record (Open) and the fourth record (Jump page immediately after opening) in the table 206. Because Page 1 of the document is opened upon opening of the document and then jumped to Page 5 by the next jumping operation, it is assumed that Page 1 has been viewed during that period. The difference in operation time between opening and page jumping equals the time period during which Page 1 has been viewed.

Also in this merging process, the fourth record (View Page 5) in the table 105 is produced from the fourth record in the table 206; i.e., Jump to Page 5, and the sixth record immediately after this record and indicating a page jump in the same document (that is, Jump to Page 6).

Further, in this merging process, a fifth record (Copy a character string) in the table 105 is produced from the fifth record (Copy a character string) in the table 206. The value of the viewed page of the produced record can be acquired from the page number in the page jumping (or opening or closing) operations before or after the character string copying operation. The copied content is the value of the "operation details" of the record in the client computer 200 to be based on. Note that the copying operation does not have the value of "viewed time period."

A sixth record (View page 6) in the table 105 is produced from the sixth record (Jump to Page 6) and a seventh record (Close the document) in the table 206.

Thus, in the use history storage unit 105 of the document management server 100, various use histories, such as a use history of viewing on a document-by-document or a page-by-page basis and a use history of a copying operation for the document provided to each user by the server 100, are formed, and such use histories are sequentially added.

The analysis unit 106 specifies a user closely related to the information of interest, on the basis of such information in the use history storage unit 105 and each document registered in the document storage unit 104. When, for example, leakage of information included in a document registered in the document storage unit 104 is discovered, an administrator managing the system uses the analysis unit 106 to specify a user who has performed an operation with a high leakage risk on the information that is highly likely to have been leaked. The process performed by the analysis unit 106 will be described with reference to FIG. 4.

Figure 4:
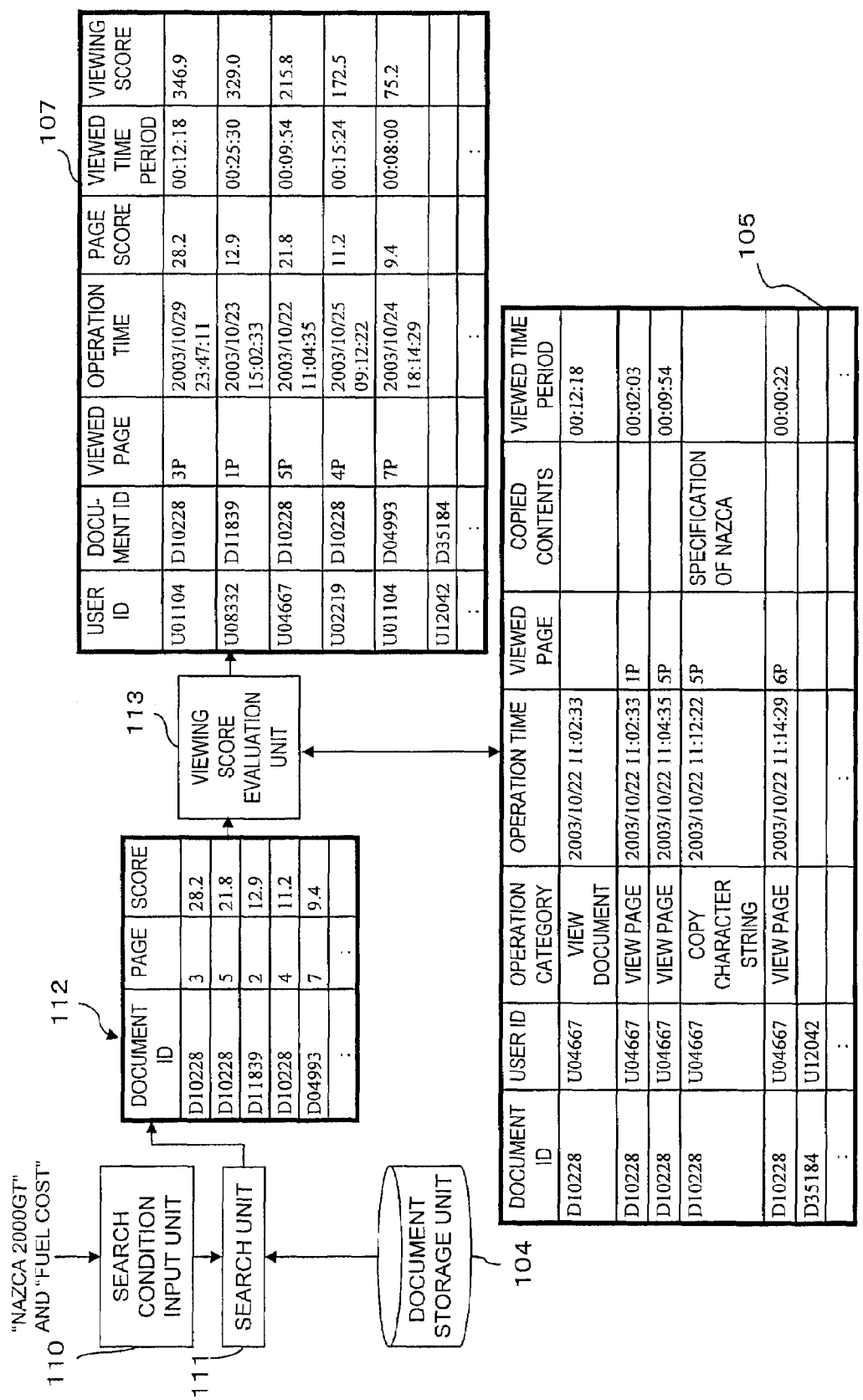
FIG. 4 is a view for describing a process performed by an analysis unit.

As shown in FIG. 4, the analysis unit 106 includes a search condition input unit 110, a search unit 111, and a viewing score evaluation unit 113.

An analyst (such as a system administrator) inputs a search condition indicating information of interest (such as information highly likely to have been leaked) to the search condition input unit 110. The example in the figure shows an analysis process for specifying a leakage source when a "fuel cost" of an automobile called "Nazca 2000GT" is leaked. In this example, the analyst inputs the keywords "Nazca 2000GT" and "fuel cost" as search conditions.

The search unit 111 calculates a score (page score) indicating the closeness of fit for the search conditions input to the search condition input unit 110 for each page of each document stored in the document storage unit 104. The page score may be calculated using a calculation formula yielding a higher value for a page with higher frequency of appearance of the keyword specified in the search conditions. As such a calculation formula, "TF*IDF product" may be used. This is the product of an appearance frequency of the keyword (i.e. term frequency: TF) in a page and an inverse of the number of documents including the keyword among all the documents stored in the document storage unit 104 (i.e. inverted document frequency: IDF) (or a log thereof). When multiple keywords are specified, the TF*IDF products for respective keywords may be combined (the TF*IDF products of the respective keywords may be multiplied) to obtain a page score. Naturally, the above-described method of acquiring a page score is only an example, and various calculation methods for deriving the closeness of fit of an object (such as a page) for the search conditions may be used. The search unit 111 may use any of such conventional calculation methods.

As in a known search technique, a synonym of the specified keyword may be obtained from a dictionary to derive the score taking the obtained synonym into consideration.

The search unit 111 performs the above-described process, and outputs a search result 112 shown in FIG. 4. The search result 112 is a list of the pages of documents in order of descending page score. The page of the document is specified by a pair consisting of document ID and page number. The reason why the pages are sorted in order of page score is to enhance the process efficiency by processing the pages starting from the page highly relevant to the search conditions. Such a sorting action is not necessary if the processing efficiency is of no consequence.

The viewing score evaluation unit 113 puts together the search result 112 and the information stored in the use history storage unit 105, thereby obtaining a viewing score indicating the user's degree of relevance to the page including the information of interest (i.e. search conditions); that is, the degree of importance for the purpose of analysis.

For example, the page score of the page indicated by the search result 112 and the user's viewed time period of the page obtained from the use history storage unit 105 may be multiplied, and the product may be used as the user's viewing score for the page. In this process, pages of the document are selected one by one in descending order of the page score in the search result 112, and the use history record including the selected page as the "viewed page" is extracted from the use history storage unit 105. For each extracted use history record, the viewed time period of the record and the score of the page are multiplied, and the product is obtained as the viewing score (i.e. the importance score) for the record. This process is repeated from the page having the highest page score until predetermined termination conditions are satisfied. The termination conditions may be completion of a process for a predetermined number of pages, but this is merely an example, and any conditions can be used.

The higher page score can be described as having the page contents with a higher relevance to the information of interest. Also, the longer a user views a page, the higher the probability that the user carefully views the page; i.e., the higher becomes the risk of leakage or the like. Therefore, the product of the page score and the viewed time period of the page is used as the viewing score in the above description.

The analysis unit 106 thus calculates the viewing score corresponding to each use history record, and sorts the use history records in descending order of the viewing score. The analysis result presentation unit 107 displays the sort result. In the example of FIG. 4, the analysis result provided by the analysis result presentation unit 107 shows, starting from the use history record having the highest viewing score, the user ID, document ID, page number of the viewed page, and operation time of the use history record, and also the page score, viewed time period and score of the viewed page. Examining the displayed analysis result, the analyst can find the user indicating active involvement in the page closely related to the information of interest. As a result, users indicating active involvement in, for example, the leaked information can be narrowed down.

This example is based on the idea that the user viewing the page highly related to the information of interest for a longer time becomes more important for the purpose of tracking use of the document.

Although in the above example the product of the page score and the viewed time period of the page of interest is used as the viewing score, it is only an example, and other functions showing a higher viewing score as the page score or viewed time period increases may be used.

Further, it is also possible to obtain from the use history record the operation a user has performed on the page (such as copying data in the page) while he/she was viewing the page, and an operation score of the user for the page in accordance with the type of operation ("operation category"), thereby deriving the viewing score from the operation score and the page score. When, for example, data, such as a character string, in a page are copied, it is highly likely that outflow of the data is caused by the copying operation, and therefore a higher operation score may be assigned to the copying operation rather than a simple viewing operation. The relation between the operation category and the operation score may be pre-registered in the analysis unit 106.

The operation score may be varied even for the same operation category in accordance with quantitative information. For example, a higher operation score may be given to the operation of copying a longer character string. Alternatively, a higher operation score may be given to the operation with a higher ratio of including the search keyword in the copied character string. It may be preferable to assign a high operation score when a specific numeric expression related to the search keyword is included in the copied character string, because such numeric information is often important in terms of information leakage monitoring. For example, a process, such as multiplying the operation score by a predetermined coefficient greater than 1, may be performed when a character string indicating a fuel cost, such as "22 km/liter," is copied if the keyword "fuel cost" is used. For such a process, the viewing score evaluation unit 113 has a function of extracting a numeric expression including units. The viewing score evaluation unit 113 may also be provided with a correspondence table between an attribute of a keyword and a numeric expression (i.e. unit) corresponding to that attribute. In such a correspondence table, the attribute "speed" may be associated with numeric expression forms "XX hours," "XX seconds," "XX km/h," and the like, and the attribute "price" may be associated with numeric expression forms "XX yen." "XX dollars." The attributes "time and date" or "period" is associated with "XX/XX (month/day)," "next spring," and "next fiscal year" (the expression "next spring" is also included in the numeric expression in a broad sense). In such a case, the attribute of the specified keyword may be acquired from the dictionary to specify the numeric expression form corresponding to the attribute from the correspondence table, thereby searching for the character string conforming with such a numeric expression form among the copied character strings. A correspondence table in which the numeric expression form directly corresponds to the specific keyword rather than the attribute may also be used.

In the above-described process, the contents and length of the copied character string can be known from the column "copied contents" of the use history record.

Similarly, upon calculation of the page score, whether or not a specific numeric expression corresponding to the search keyword is included in the page may be determined, and a high page score may be assigned if the page includes the keyword. Further, a higher page score may be given to the page as the number of such specific numeric expressions included in the page increases. (The same applies to the operation score.)

For the score obtained as a function of the page score and the viewed time period, the viewing score may be obtained by considering the operation category in that use history record. For example, when a copying operation is performed on a certain page, the viewing score may be obtained by multiplying the product of the page score and the viewed time period for the page by a coefficient greater than 1 corresponding to the copying operation. In such a case as well, it may be preferable to assign a higher viewing score if the copied character string includes a specific numeric expression corresponding to the search keyword than otherwise. Also, a higher viewing score may be assigned as the degree of including a specific numeric expression corresponding to the keyword increases.

While the period between opening a document and jumping to a next page, or between one page jump and the next page jump has been assumed as the viewed time period of the page of interest in the above description, the user may have simply displayed the page rather than actually viewing the page. Therefore, the following variation may be used in view of such a possibility. In this variation, an operation of scrolling a displayed range of a page is also recorded in the use history record. The scrolling operation can be detected by monitoring a scrolling operation instruction given from an input device of the client computer 200. An upper limit of the viewed time period is provided for each operation. For example, when a page jump is made, the viewed time period does not exceed the upper limit no matter how long the time has elapsed from the time of the page jump to the next operation. When a scrolling operation is made in the same page, the time between the scrolling operation and the next operation is added to the preceding viewed time period. In this case, an upper limit is also provided for the added time period. According to such an approach, the viewed time period becomes longer as the user performs more scrolling operations in a page. The time period may be added not only for the scrolling operation but also for any operation performed in a page, such as a copying operation. Whatever the case may be, there is a point in counting user's operation during display of a page as the viewed time period, because it is highly likely that the user is viewing the page.

While the viewing score is obtained on a page-by-page basis in the above description, the viewing score may be obtained based on an element other than a page, by using such an element as a unit. Because document elements are explicitly described in a structured document, such as HTML documents and XML documents, the viewing score may be obtained by using such a document element as a unit.

Figure 5:
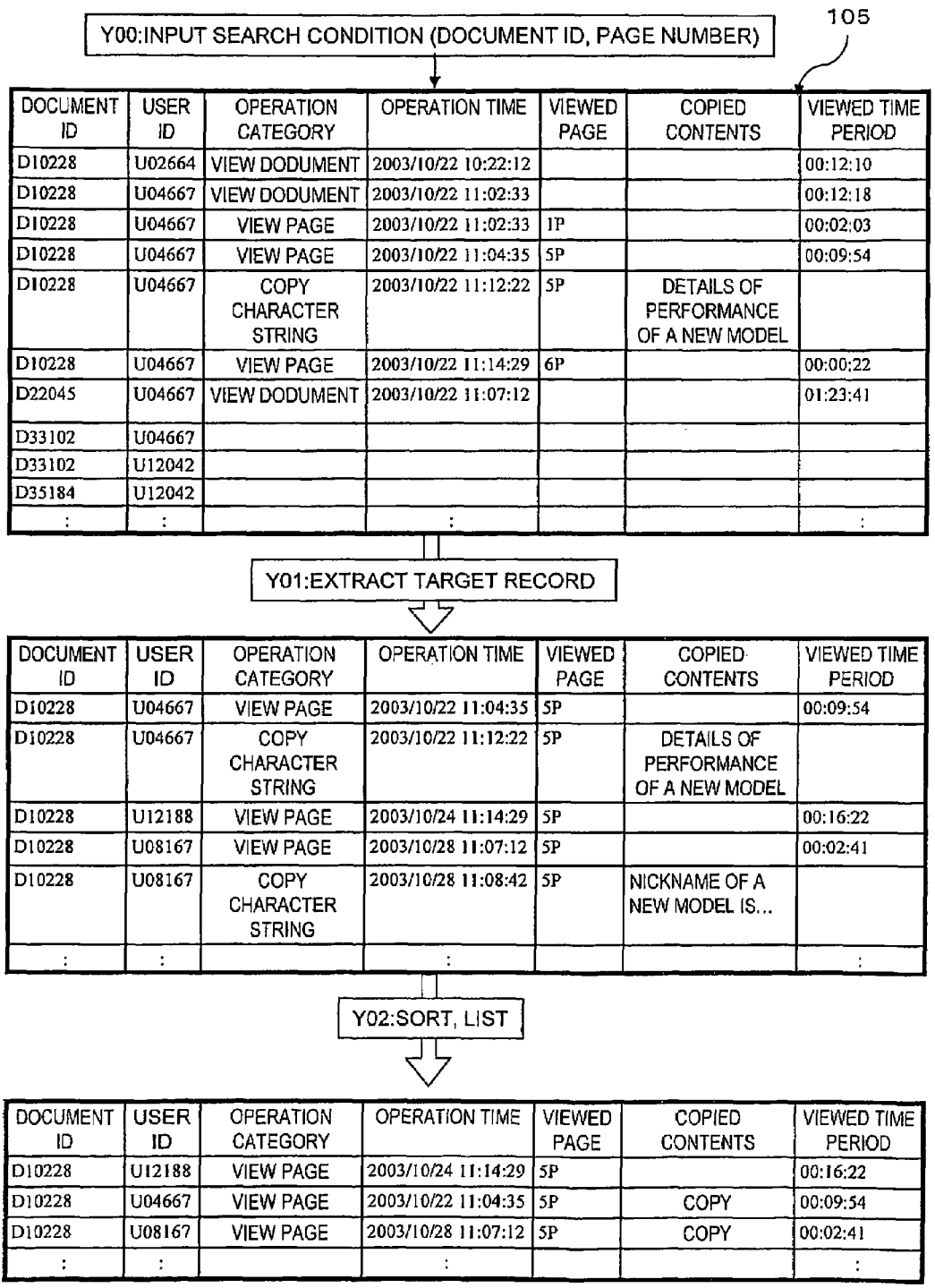
FIG. 5 shows another example of a process performed by the analysis unit.

Another possible example of an analysis process performed by the analysis unit 106 is shown in FIG. 5.

In the example of FIG. 5, input of information (such as the document ID and page number) specifying a page including information of interest (such as a page highly likely to be leaked) is received as search conditions (Y00). The analysis unit 106 extracts a record indicating an operation related to the relevant page among the use history records in the use history storage unit 105 (Y01). The unit sorts the extracted records in descending order of the viewed time period, and lists and displays the sorted result (Y02).

This example is based on the idea that the user viewing the page of the interest for a longer time is more important in view of the purpose of tracking document use. Also in this example, the score may be calculated in view of the operation category, such as copying, in addition to the viewed time period, and the user with a higher score can be regarded as the user of more importance.

While the analysis unit 106 and the analysis result presentation unit 107 are implemented as functions of the document management server 100 in the above description, the analysis unit 106 and the analysis result presentation unit 107 may be mounted as an analysis device separate from the document management server 100.

Figure 6:
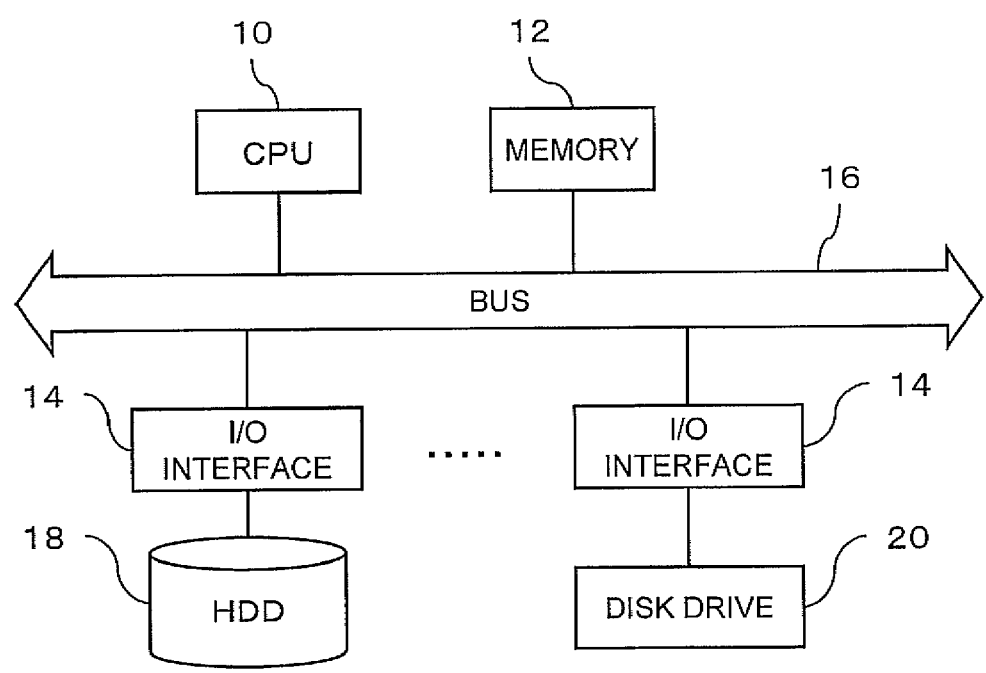
FIG. 6 shows an example of a hardware configuration of a computer in which a device according to an exemplary embodiment is mounted.

The document management server 100 or the analysis apparatus described above may be typically implemented by executing a program which describes the functions or processing contents of each unit on a computer. As shown in FIG. 6, the computer may have a circuit configuration in the form of hardware in which a CPU (Central Processing Unit) 10, memory (primary storage) 12, I/O (Input/Output) interfaces 14, and the like are connected through a bus 16. Through the bus 16, a hard disk drive 18 and a disk drive 20 for reading a portable nonvolatile recording medium of various standards such as CD, DVD, and flash memory may be connected. Such drives 18 and 20 serve as external memory storage devices. The program which contains the description of the processing of the exemplary embodiment is saved on a secondary storage device such as the hard disk drive 18 or other types of nonvolatile recording devices through a recording medium such as a CD or DVD or through a network and then installed in the computer. The program stored in the secondary storage is loaded to a memory and executed by the CPU, thereby implementing the processing of the exemplary embodiment.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A document use tracking system having a processor, comprising:
   a use history recording unit that records, for each document stored in a document storage unit, a use history record for each user about each element in the document;
   a search condition reception unit that receives an input of a search condition;
   an element score calculation unit that calculates, for each element of each document, an element score indicating closeness of fit of the element for the search condition;
   an importance score calculation unit that calculates, for each combination of an element and a user who has performed an operation on the element, an importance score based on the element score of the element and the use history record of the user for the element; and
   a monitored object information presentation unit that presents the importance score calculated by the importance score calculation unit and the user corresponding to the importance score.

2. The document use tracking system according to claim 1, wherein the importance score calculation unit calculates, on the basis of a viewed time period of the user for the element indicated by the use history record, the importance score of the user for the element.

3. The document use tracking system according to claim 1, wherein the importance score calculation unit calculates, on the basis of a type of operation performed by the user on the element indicated by the use history record, the importance score of the user for the element.

4. The document use tracking system according to claim 1, wherein the importance score calculation unit gives a higher importance score when the type of operation performed by the user on the element indicated by the use history record includes a data copying operation than non-copying operation.

5. The document use tracking system according to claim 1, wherein the importance score calculation unit gives a higher importance score when data subjected to a data copying operation indicated by the use history record includes data matching the search condition than when data subjected to a data copying operation indicated by the use history record does not include data matching the search condition.

6. The document use tracking system according claim 1, wherein the importance score calculation unit gives a higher importance score when data subjected to a data copying operation indicated by the use history record include a numeric value related to the search condition than when data subjected to a data copying operation indicated by the use history record does not include a numeric value related to the search condition.

7. The document use tracking system according to claim 1, further comprising
   a document use unit that is installed in a terminal device used by each user, provides a user with a document, and receives a user's operation on each element of the document, wherein the document use unit comprises
   a history production unit that produces a use history record indicating a record of a user's operation on each element of the document, and
   a history transmission unit that transmits the use history record produced by the history production unit to the use history recording unit, and
   the use history recording unit records the use history record transmitted from the history transmission unit of the terminal device of each user.

8. A computer readable recording medium storing a program causing a computer to execute a process for tracking use of a document by a user, the process comprising:
   recording, for each document stored in a document storage unit, a use history record for each user about each element in the document;
   receiving an input of a search condition;
   calculating, for each element of each document, an element score indicating closeness of fit of the element for the search condition; and
   calculating, for each combination of an element and a user who has performed an operation on the element, an importance score based on the element score of the element and the use history record of the user for the element, and presenting the calculated importance score and the user corresponding to the importance score.

9. The medium according to claim 8, wherein calculating the importance score comprises
   calculating, on the basis of a viewed time period of the user for the element indicated by the use history record, the importance score of the user for the element.

10. The medium according to claim 8, wherein calculating the importance score comprises
    calculating, on the basis of a type of operation performed by the user on the element indicated by the use history record, the importance score of the user for the element.

11. The medium according to claim 8, wherein calculating the importance score comprises
    giving a higher importance score when the type of operation performed by the user on the element indicated by the use history record includes a data copying operation than a non-copying operation.

12. The medium according to claim 8, wherein calculating the importance score comprises
    giving a higher importance score when data subjected to a data copying operation indicated by the use history record include data matching the search condition than when data subjected to a data copying operation indicated by the use history record does not include data matching the search condition.

13. The medium according to claim 8, wherein calculating the importance score comprises
    giving a higher importance score when data subjected to a data copying operation indicated by the use history record include a numeric value related to the search condition than when data subjected to a data copying operation indicated by the use history record does not include a numeric value related to the search condition.

14. A method of tracking use of a document by a user, comprising:

recording, for each document stored in a document storage unit, a use history record for each user about each element in the document;

receiving an input of a search condition;

calculating, for each element of each document, an element score indicating closeness of fit of the element for the search condition;

calculating, for each combination of an element and a user who has performed an operation on the element, an importance score based on the element score of the element and the use history record of the user for the element; and presenting the calculated importance score and the user corresponding to the importance score.

15. The method according to claim 14, wherein calculating the importance score comprises calculating, on the basis of a viewed time period of the user for the element indicated by the use history record, the importance score of the user for the element.

16. The method according to claim 14, wherein calculating the importance score comprises calculating, on the basis of a type of operation performed by the user on the element indicated by the use history record, the importance score of the user for the element.

* * * * *